(12) United States Patent
Takeda

(10) Patent No.: US 11,543,367 B2
(45) Date of Patent: Jan. 3, 2023

(54) METHOD ACQUIRING PROJECTION IMAGE, CONTROL APPARATUS, CONTROL PROGRAM, PROCESSING APPARATUS, AND PROCESSING PROGRAM

(71) Applicant: Rigaku Corporation, Akishima (JP)

(72) Inventor: Yoshihiro Takeda, Kokubunji (JP)

(73) Assignee: RIGAKU CORPORATION, Akishima (JP)

( * ) Notice: Subject to any disclaimer, the term of this patent is extended or adjusted under 35 U.S.C. 154(b) by 155 days.

(21) Appl. No.: 16/845,763

(22) Filed: Apr. 10, 2020

(65) Prior Publication Data
US 2020/0326289 A1    Oct. 15, 2020

(30) Foreign Application Priority Data

Apr. 11, 2019    (JP) .............................. JP2019-075312

(51) Int. Cl.
*G01N 23/046*    (2018.01)
*G06T 15/08*    (2011.01)

(52) U.S. Cl.
CPC .......... *G01N 23/046* (2013.01); *G06T 15/08* (2013.01); *G01N 2223/1016* (2013.01); *G01N 2223/306* (2013.01); *G01N 2223/32* (2013.01); *G01N 2223/3306* (2013.01); *G01N 2223/419* (2013.01); *G01N 2223/42* (2013.01); *G01N 2223/61* (2013.01); *G01N 2223/611* (2013.01); *G01N 2223/615* (2013.01); *G01N 2223/645* (2013.01); *G01N 2223/6462* (2013.01)

(58) Field of Classification Search
None
See application file for complete search history.

(56) References Cited

U.S. PATENT DOCUMENTS

| 7,983,386 | B2 | 7/2011 | Yellepeddi et al. |
| 2010/0111251 | A1 | 5/2010 | Yellepeddi et al. |
| 2020/0326289 | A1* | 10/2020 | Takeda ................. G01N 23/046 |

FOREIGN PATENT DOCUMENTS

| DE | 102018105709 A1 * | 9/2018 | ............. G01B 15/00 |
| DE | 102021204628 B3 * | 4/2022 | ........... G01N 23/046 |
| JP | 6-94651 A | 4/1994 | |
| JP | H0694651 A * | 4/1994 | |

(Continued)

OTHER PUBLICATIONS

Japanese Office Action dated Aug. 23, 2022 for Application No. 2019-075312 with an English translation.

*Primary Examiner* — Thomas R Artman
(74) *Attorney, Agent, or Firm* — Birch, Stewart, Kolasch & Birch, LLP

(57) ABSTRACT

There is provided an acquiring method of a projection image of a sample whose shape is uneven with respect to a rotation center, the method comprising the steps of setting the sample S0 at a position of the rotation center C0 provided between an X-ray source 116a and a detector 117, and acquiring the projection image of the sample S0 at each different rotation angle for each different magnification ratio over a rotation angle of 180° or more by rotating the sample S0 around the rotation center C0, and by relatively changing a separation distance between the X-ray source and the rotation center, or a separation distance between the rotation center and the detector in an optical axis direction according to the shape of the sample S0 and the rotation angle of the sample S0.

13 Claims, 21 Drawing Sheets

(56) References Cited

FOREIGN PATENT DOCUMENTS

| JP | 2006-133008 A | | 5/2006 | |
|---|---|---|---|---|
| JP | 2006133008 A | * | 5/2006 | |
| JP | 2008-122178 A | | 5/2008 | |
| JP | 2010-520467 A | | 6/2010 | |
| JP | 2010-169647 A | | 8/2010 | |
| JP | 2010169647 A | * | 8/2010 | ............. A61B 6/032 |
| JP | 5011859 B2 | | 8/2012 | |
| JP | 2017-58298 A | | 3/2017 | |
| JP | 2018-31759 A | | 3/2018 | |

* cited by examiner

|   | ANGLE(°) | A(mm) | GEOMETRICAL MAGNIFICATION RATIO | EFFECTIVE PIXEL SIZE(μm) |
|---|---|---|---|---|
| 1 | 0-3 | 24 | 10 | 5 |
| 2 | 3-18 | 48 | 5.5 | 9 |
| 3 | 18-65 | 88 | 2.7 | 18 |
| 4 | 65-80 | 138 | 1.8 | 28 |
| 5 | 80-90 | 158 | 1.5 | 38 |

FIG. 16

METHOD ACQUIRING PROJECTION IMAGE, CONTROL APPARATUS, CONTROL PROGRAM, PROCESSING APPARATUS, AND PROCESSING PROGRAM

TECHNICAL FIELD

The present invention relates to a imaging method of a projection image, a control apparatus for imaging, a control program, a processing apparatus for a acquired projection image, and a processing program.

RELATED ART

X-ray CT collects a plurality of projection images (data for CT) while rotating a sample by 360°. Then, a three-dimensional CT image at spatial resolution according to a magnification ratio is obtained by reconfiguring the resulting data for CT. According to the X-ray CT, the magnification ratio and the spatial resolution are varied depending on the position of the sample set between an X-ray source and an X-ray detector. The projection image having a high magnification ratio can be collected, and the three-dimensional CT tomographic image having a high spatial resolution is acquired by approaching the sample to the X-ray source.

For example, a smartphone, an electronic substrate, a lamination material such as a carbon fiber reinforced resin or the like is constituted from a fine structure or component having a size of several μm, and thus it is preferable to approach the sample to the X-ray source as close as possible, and to be acquired by increasing the magnification ratio.

However, the shape of the above-described sample is in a plate shape whose one direction is long. When such a plate-shaped sample is approached to the X-ray source, and rotated, both of them come into contact with each other. In contrast, it is conventionally carried out that the X-ray source and the sample are kept at a fixed distance based on width of the plate-shaped sample, and the sample is rotated and imaged while holding the distance. In this case, the shortest distance between the X-ray source and the sample is limited by the width of the sample. For example, a method of three-dimensionally acquiring an appearance shape with a three-dimensional scanner in place of visual observation in order to prevent contact is disclosed in Patent Document 1.

Further, it appears that the contact of a sample with an apparatus is prevented by rotating the sample at an angle of less than 180°. A method of reconfiguring a tomographic image of an object using radiation transmission data taken in at a rotation of less than 180° by a rotary stage by preventing interference of the sample and the apparatus with a contact sensor is disclosed in Patent Document 2.

On the other hand, as a method of performing CT measurement by increasing a magnification ratio while rotating a plate-shaped sample by 360°, when CT-observing an internal fine structure, employed is a method in which the sample cut into a columnar shape is approached to an X-ray source, and is imaged by rotating the sample by 360°.

PATENT DOCUMENT

[Patent Document 1] Japanese Unexamined Patent Application Publication No. 2018-031759
[Patent Document 2] Japanese Patent No. 5011859

However, the method involving cutting of a sample as described above does not match the original purpose of nondestructively observing an internal structure. If no cutting is carried out, the rotation or resolution of the sample is limited to width of the sample, and thus the fine structure to be observed cannot be drawn.

SUMMARY OF THE INVENTION

The present invention has been made in view of such a situation, and it is an object to provide a method acquiring a projection image nondestructively and efficiently at high spatial resolution, and to provide a control apparatus, a control program, a processing apparatus and a processing program thereof.

(1) In order to achieve the above-described object, it is a feature that the method according to the present invention is a method acquiring a projection image of a sample whose shape is uneven with respect to a rotation center, the method comprising the steps of setting the sample at a position of the rotation center provided between an X-ray source and a detector, and acquiring the projection image of the sample at each different rotation angle for each different magnification ratio over a rotation angle of 180° or more by rotating the sample around the rotation center, and by relatively changing a separation distance between the X-ray source and the rotation center, or a separation distance between the rotation center and the detector in an optical axis direction according to the shape of the sample and the rotation angle of the sample.

In this manner, when approaching or separating the X-ray source or the detector to/from the rotation center, imaging is carried out at each different rotation angle for each different magnification ratio over a rotation angle of 180° or more, and thus the projection image can be efficiently and nondestructively acquired at high spatial resolution.

(2) Further, it is a feature that the method acquiring the projection image according to the present invention is the method, wherein the X-ray source is approached or separated to/from the rotation center in order to acquire the projection image. Consequently, the application to micro-CT using a micro-focus X-ray source becomes possible.

(3) Further, it is a feature that the method acquiring the projection image according to the present invention is the method, wherein the detector is approached or separated to/from the rotation center in order to acquire the projection image. Consequently, the application to an X-ray microscope becomes possible. The projection image in which an influence of blurring is reduced can be acquired by varying the separation distance between the sample and the detector according to the shape of the sample. Then, the CT image whose blurring in a fixed angle range is reduced can be obtained.

(4) Further, it is a feature that the method acquiring the projection image according to the present invention is the method, wherein rotation of the sample, and changing of the separation distance are simultaneously and continuously performed. Consequently, the projection image can be acquired by one continuous movement control.

(5) Further, it is a feature that the method acquiring the projection image according to the present invention is the method, wherein the X-ray source when being most approached to the rotation center is in a track formed by one rotation of the sample around the rotation center. Consequently, the projection image can be acquired by approaching to a position colliding with the sample when one rotation is originally made, and thus the projection image at high spatial resolution can be obtained.

(6) Further, it is a feature that the method acquiring the projection image according to the present invention is the method, wherein a surrounding virtual shape including the shape of the sample is recognized with a set of positions for angles around the rotation center as a central axis, and the X-ray source is controlled not to collide with the sample using the surrounding virtual shape. Consequently, the collision of the X-ray source with the sample can be avoided.

(7) Further, it is a feature that the method acquiring the projection image according to the present invention is the method, wherein the surrounding virtual shape is recognized by integrated cross-sections perpendicular to the rotation center of the sample. Consequently, the calculation for avoiding the collision of the X-ray source with the sample becomes easy.

(8) Further, it is a feature that the method acquiring the projection image according to the present invention is the method, wherein the surrounding virtual shape is provided as a columnar body in a simple shape, and the X-ray source is controlled not to enter an inside of the surrounding virtual shape. Consequently, the calculation for avoiding the collision of the X-ray source with the sample is simplified.

(9) Further, it is a feature that the method acquiring the projection image according to the present invention is the method, wherein the track of the X-ray source with respect to the rotation center is determined by fitting a pole of the surrounding virtual shape with a curve function representing a waveform. Consequently, an appropriate track of the X-ray source can be determined when the housing width of the X-ray source is large.

(10) Further, it is a feature that the method acquiring the projection image according to the present invention is the method, wherein a position in an end portion on the X-ray source side of the sample is monitored, and the X-ray source is controlled for separating from the rotation center with a predetermined distance when a separation distance between the end portion of the sample and the X-ray source becomes a threshold value or less. Consequently, the separation distance between the X-ray source and the rotation center can be taken without recognizing the shape of the sample.

(11) Further, it is a feature that the method acquiring the projection image according to the present invention is the method, further comprising the step of providing an interest region of the sample, wherein the sample is set to make the interest region of the sample close to the rotation center. Consequently, a desired place of a user can be observed at high spatial resolution.

(12) Further, it is a feature that the method acquiring the projection image according to the present invention is the method, wherein with respect to each of the interest region and other than the interest region, a rotation angle at which acquiring is performed according to a desired pixel size is determined. Consequently, found is the resolution according to an angle of a structure to be viewed by a user.

(13) Further, it is a feature that the method acquiring the projection image according to the present invention is the method, wherein the sample that is formed into a plate shape with a base material and a filler dispersed in the base material. This can be applied to the test/inspection of an electronic substrate and a carbon fiber reinforced resin by using CT.

(14) Further, it is a feature that the control apparatus according to the present invention is a control apparatus for acquiring a projection image of a sample whose shape is uneven with respect to a rotation center, the control apparatus comprising a rotation control section that rotates the sample set at a position of the rotation center provided between an X-ray source and a detector around the rotation center, an advancing/retreating control section by which the X-ray source or the detector is approached or separated to/from the rotation center according to the shape of the sample and the rotation angle of the sample, and an acquiring control section that acquires the projection image of the sample at each different magnification ratio for each different rotation angle over a rotation angle of 180° or more. Consequently, projection images can be efficiently and nondestructively acquired at high spatial resolution.

(15) Further, it is a feature that the control program according to the present invention is a non-transitory computer readable recording medium having recorded thereon a control program for acquiring a projection image of a sample whose shape is uneven with respect to a rotation center, the program causing a computer to execute the control processes of rotating the sample set at a position of the rotation center provided between an X-ray source and a detector around the rotation center, approaching or separating the X-ray source or the detector to/from the rotation center according to the shape of the sample and the rotation angle of the sample, and acquiring the projection image of the sample at each different magnification ratio for each different rotation angle over a rotation angle of 180° or more. Consequently, the projection image can be efficiently and nondestructively acquired at high spatial resolution.

(16) Further, it is a feature that the processing apparatus according to the present invention is a processing apparatus that processes a projection image of a sample whose shape is uneven with respect to a rotation center, the processing apparatus comprising a storage section that stores projection image data of the sample acquired at each different rotation angle for each different magnification ratio, a pixel adjustment section that matches a pixel size of the stored projection image data of the sample to a fixed reference, and a reconfiguration section that reconfigures a three-dimensional CT image using the projection image data obtained by adjusting the pixel size. Consequently, the three-dimensional CT image at high spatial resolution can be reconfigured in a desired region of a user.

(17) Further, it is a feature that the processing program according to the present invention is a non-transitory computer readable recording medium having recorded thereon a processing program for processing a projection image of a sample whose shape is uneven with respect to a rotation center, the program causing a computer to execute the processes of storing projection image data of the sample acquired at each different rotation angle for each different magnification ratio, matching a pixel size of the stored projection image data of the sample to a fixed reference, and reconfiguring a three-dimensional CT image using the projection image data obtained by adjusting the pixel size. Consequently, the three-dimensional CT image at high spatial resolution can be reconfigured in a desired region of a user.

According to the present invention, three-dimensional CT images can be efficiently and nondestructively acquired at high spatial resolution.

BRIEF DESCRIPTION OF THE DRAWINGS

FIG. 16 is a table showing an image acquiring point and an effective pixel size for each projection image in Example.

DETAILED DESCRIPTION OF EMBODIMENTS

Figure 1A:
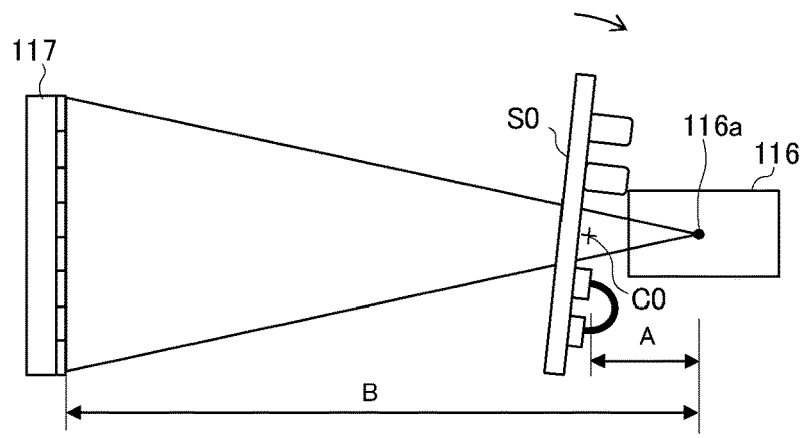
FIGS. 1A to 1C each are a side view showing the arrangement of an X-ray source and a sample with respect to a rotation angle of a plate-shaped sample thereof.

Next, embodiments of the present invention are described referring to the drawings. In order to facilitate understanding of the description, reference number indicating the same constituent element is used as same and overlapping descriptions are omitted in each drawing.

[Principle]

Figure 1B:
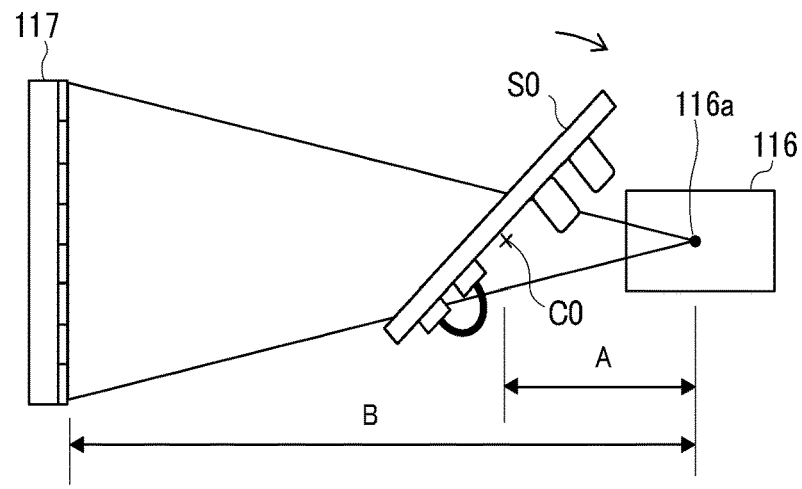
Figure 1C:
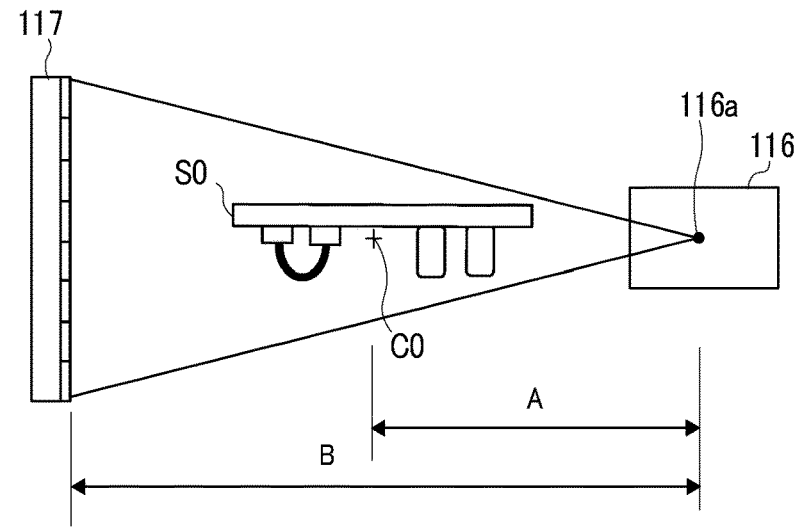

The principle according to the present invention is described using an operational example. FIGS. 1A to 1C each are a side view showing the arrangement of an X-ray source 116a and a sample S0 with respect to a rotation angle of a plate-shaped sample thereof. As shown in FIGS. 1A to 1C, as to an imaging method according to the present invention, projection image data is acquired with a detector 117 by rotating a sample S0 around a rotation center C0, while moving the sample S0 in an optical axis direction via an operation of a rotation stage not to contact with an X-ray generation section 116. In addition, an X-ray source 116a is present inside the X-ray generation section 116, and may be considered to have a point-like size relatively to a housing of the X-ray generation section 116.

In FIG. 1A, the sample S0 directs a plate-shaped main surface to the X-ray source 116a, and the sample S0 is most approached to the X-ray source 116a. A magnification ratio represented by B/A becomes large when being approached thereto, and becomes small when being separated therefrom. In FIG. 1B, the sample S0 is separated from the X-ray source 116a as the sample S0 is rotated. Then, in FIG. 1C, the sample S0 is further rotated; a plate-shaped end face is directed to the X-ray source 116a; and the sample S0 is further separated from the X-ray source 116a.

In this way, the projection image that discretely changes a magnification ratio according to the shape of the sample S0 is obtained. Then, the three-dimensional CT image changed depending on a direction by the spatial resolution can be reconfigured by varying a magnification ratio of back projection depending on the direction during reconfiguration of the three-dimensional CT image.

As described above, according to the present invention, the spatial resolution of tomographic images is changed depending on the direction, but is proportional to a reciprocal of an aspect ratio of the sample cross-sectional shape in a direction where the spatial resolution is improved most, and thus it becomes possible to observe a fine structure. The tomographic image obtained by observing a plate-shaped sample made of a practically industrial material from the normal direction is expected to improve the spatial resolution 10 times or more.

Specifically, The spatial resolution viewed from the normal direction of a smartphone, an electronic substrate, a carbon fiber reinforced resin, a laminated filter or the like can be raised approximately to the theoretical resolution of X-ray Micro CT, and thus the fine structure inside a large sample is able to be nondestructively observed. The specific configuration and method for carrying out the present invention are explained as described below.

First Embodiment (Configuration of X-Ray CT Measurement System)

Figure 2:
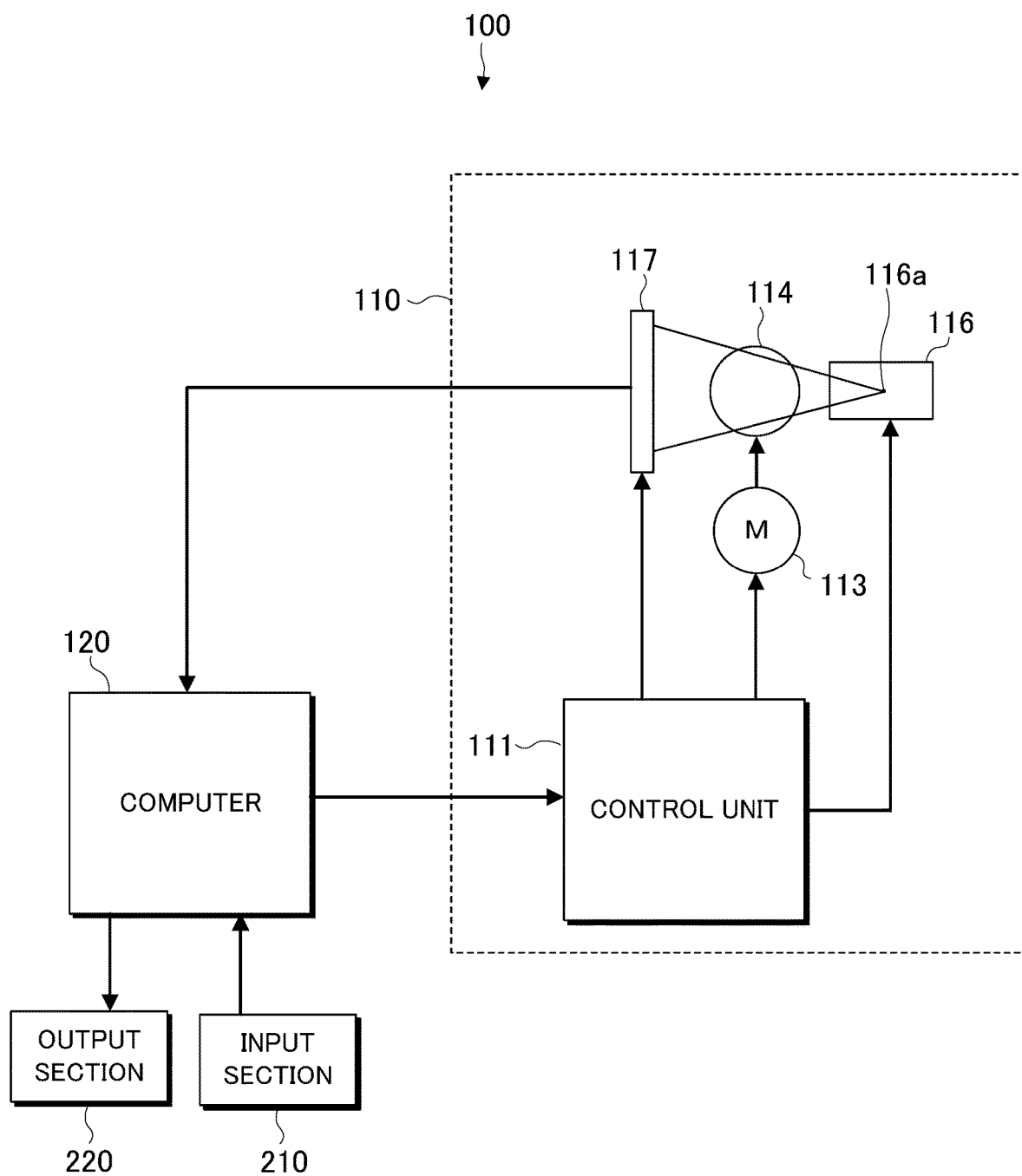
FIG. 2 is a schematic diagram showing an X-ray CT measurement system according to the first embodiment.

FIG. 2 is a schematic diagram showing an X-ray CT measurement system 100. As shown in FIG. 2, the X-ray CT measurement system 100 comprises a imaging apparatus 110, a computer 120 (a control apparatus and a processing apparatus), an input section 210, and an output section 220. These apparatuses and sections each are connected thereto in a wired/wireless manner, and are possible to transmit and receive control information, acquiring data and so forth.

(Configuration of Imaging Apparatus)

The imaging apparatus 110 comprises a control unit 111, a stage drive mechanism 113, a sample stage 114, an X-ray generation section 116, and a detector 117, and performs X-ray CT acquiring of a held sample. The X-ray generation section 116 is provided with an X-ray source 116a therein. According to the imaging apparatus 110 used for X-ray CT, acquired projection image data (projection image data) is transmitted to the computer 120.

The control unit 111 receives an instruction from the computer 120 to control approaching or separating of the X-ray generation section 116 and the detector 117 to/from a rotation center, while controlling rotation of the sample stage 114 at an instructed speed. Further, the control unit 111 receives an instruction from the computer 120 to control acquiring of the projection image with the X-ray generation section 116 and the detector 117.

The stage drive mechanism 113 can adjust the position of the rotation center of the sample stage 114 with respect to the X-ray source 116a and the detector 117. Further, the stage drive mechanism 113 is possible to rotate the sample stage 114 at a speed that is set during CT imaging. Further, after finishing imaging, the sample stage 114 can be reversely rotated to the original position.

As to the sample stage 114, the sample can be placed and fixed. The sample stage 114 is provided so as to be rotatable with respect to the X-ray source 116a and the detector 117 in order to obtain the projection image data via rotary imaging. In addition, according to those described above, the imaging apparatus 110 is explained as a stage drive type apparatus, but it may be an arm type apparatus of rotating the X-ray source 116a and the detector 117 inclusive of a rotation arm. That is, images are acquired by the relative position relationship between the sample and the X-ray source 116a as well as the detector 117, and thus employed may be a method of moving or rotating the X-ray source 116a and the detector 117 with respect to the sample. Further, according to the present invention, the arrangement of the rotation center to the X-ray source, and the rotation position of the sample to the X-ray source as well as the detector are in the relative relationship, and thus the rotation of one to the other, or approaching or separating one to/from the other is equivalent to the rotation of the other to the one, or approaching or separating the other to/from the one.

The X-ray generation section 116 and the detector 117 are basically fixed, but the distance between both of them may be adjustable. The sample stage 114 is rotatably provided with an axis provided perpendicularly to an optical axis as a rotation center on the optical axis that connects the X-ray source 116a and the detector 117. Further, the sample stage 114 is movably provided, inclusive of the rotation center.

The X-ray generation section 116 that generates X-rays by the X-ray source 116a irradiates toward the detector 117. The detector 117 that is formed into a panel shape has a radiation receiving face for receiving X-rays. The detector 117 detects X-rays passing through a sample, that are irradiated from the X-ray generation section 116. The imaging apparatus 110 performs CT acquiring at calculated CT acquiring start timing to acquiring projection image data of the sample.

(Sample)

A sample whose shape is uneven with respect to a rotation center of the sample stage 114 is preferable. Specifically, preferred is the case of having a characteristic uneven shape as in the case where a sample is plate-shaped. For example, preferably suitable is a sample formed in a plate shape, that contains a base material and a filler dispersed in the base material. Application to test/inspection of an electronic substrate and a carbon fiber reinforced resin using CT can be made by utilizing such advantages. When it is taken into consideration to be used for inspecting fine structures, specifically it is preferable to use X-ray Micro CT for which an X-ray focal size is set to a micron order for measurements.

(Configuration of Computer)

Figure 3:
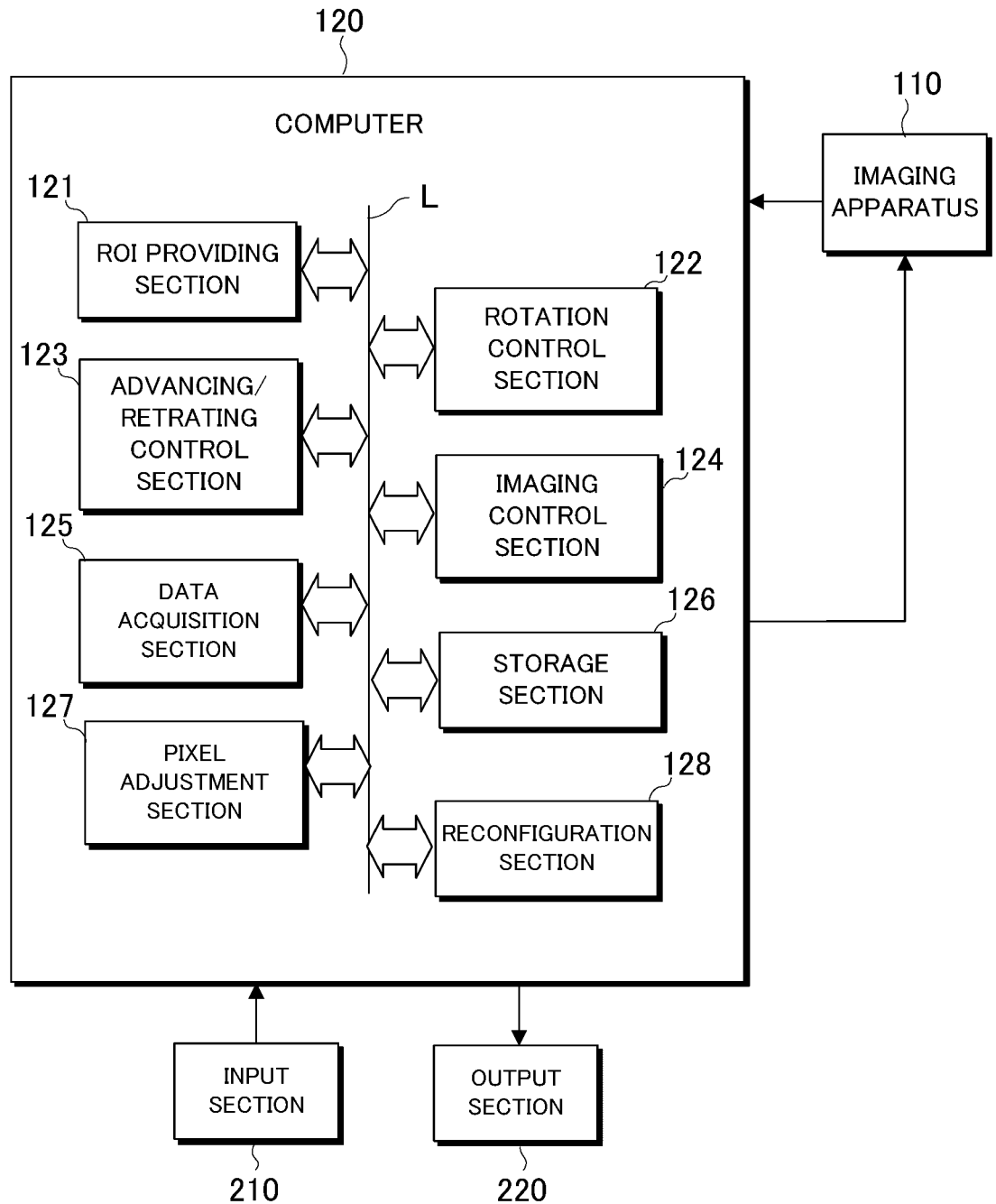
FIG. 3 is a block diagram showing an X-ray CT measurement system according to the first embodiment.

FIG. 3 is a block diagram showing an X-ray CT measurement system 100. FIG. 3 mainly shows a functional configuration of a computer (a control apparatus and a processing apparatus). The computer 120 that is for example, a PC is constituted from a processor for executing a processing, a memory or a hard disk for storing a program and data, and so forth. The computer 120 comprises an ROI providing section 121, a rotation control section 122, an advancing/retreating control section 123, an imaging control section 124, a data acquisition section 125, a storage section 126, a pixel adjustment section 127, and a reconfiguration section 128. As to each section, information can be transmitted/received by a control bus L.

The computer 120 also serves as a processing apparatus while serving as a control apparatus. Each function is performed by causing the computer 120 to execute a program. As shown in FIG. 3, the computer 120 receives a user input from an input section 210 such as a keyboard, a mouse, or the like. On the other hand, the computer 120 makes an output section 220 such as a display or the like display a sample shape image, a reconfiguration image, an input screen, or the like.

(Control Apparatus)

The computer 120 transmits an imaging condition or the like to the imaging apparatus 110, and controls an operation of the imaging apparatus 110. The ROI providing section 121 stores ROI (Region of Interest; interest region) based on the user input after setting the sample. The position is preferably adjusted to make ROI approach a rotation center, and it is preferable that an appropriate sample position is automatically calculated to make position adjustment.

The rotation control section 122 rotates a sample around the rotation center C0, the sample set at the position of the rotation center C0 that is provided between the X-ray source 116a and the detector 117. The advancing/retreating control section 123 approaches or separates the X-ray source 116a or the detector 117 to/from the rotation center C0 according to an shape of a sample S0 and a rotation angle θ of the sample S0.

It is preferable that rotation of the sample S0, and movement of approaching or separating the X-ray source 116a to/from the rotation center C0 are simultaneously and continuously performed. The simultaneousness and continuousness thereof mean that time when the sample S0 is rotated, and time when the X-ray source 116a is approached or separated to/from the rotation center C0 are duplicated. Consequently, the projection image can be acquired in a single continuous movement control.

The imaging control section 124 controls an imaging operation by the X-ray generation section 116 and the detector 117 to acquire the projection image data. In this case, imaging is efficiently carried out while rotating the sample S0. As a result of this, the projection image of the sample at each different magnification ratio for each different rotation angle is acquired over a rotation angle of 180° or more.

(Processing Apparatus)

The computer 120 processes the acquired projection image data. The data acquisition section 125 acquires the projection image data of a acquired sample from the imaging apparatus 110. The storage section 126 stores the acquired projection image data of the sample. For example, stored is the projection image data of the sample acquired at each different rotation angle for each different magnification ratio. Further, the storage section 126 stores a value of each pixel that has been calculated by the pixel adjustment section 127.

The pixel adjustment section 127 matches a pixel size of the stored projection image data of the sample to a fixed reference, and changes it. It is preferable to be changed to the smallest pixel size among those set according to the magnification ratio of the originally acquired projection image data.

The reconfiguration section 128 reconfigures a three-dimensional CT image using the projection image data obtained by adjusting the pixel size. Consequently, the three-dimensional CT image at high spatial resolution in a region desired by a user can be reconfigured. The resulting three-dimensional CT image is displayed by the output section 220 such as a display or the like. Further, the projection image data may be displayed during CT imaging.

(Imaging Method)

Figure 4:
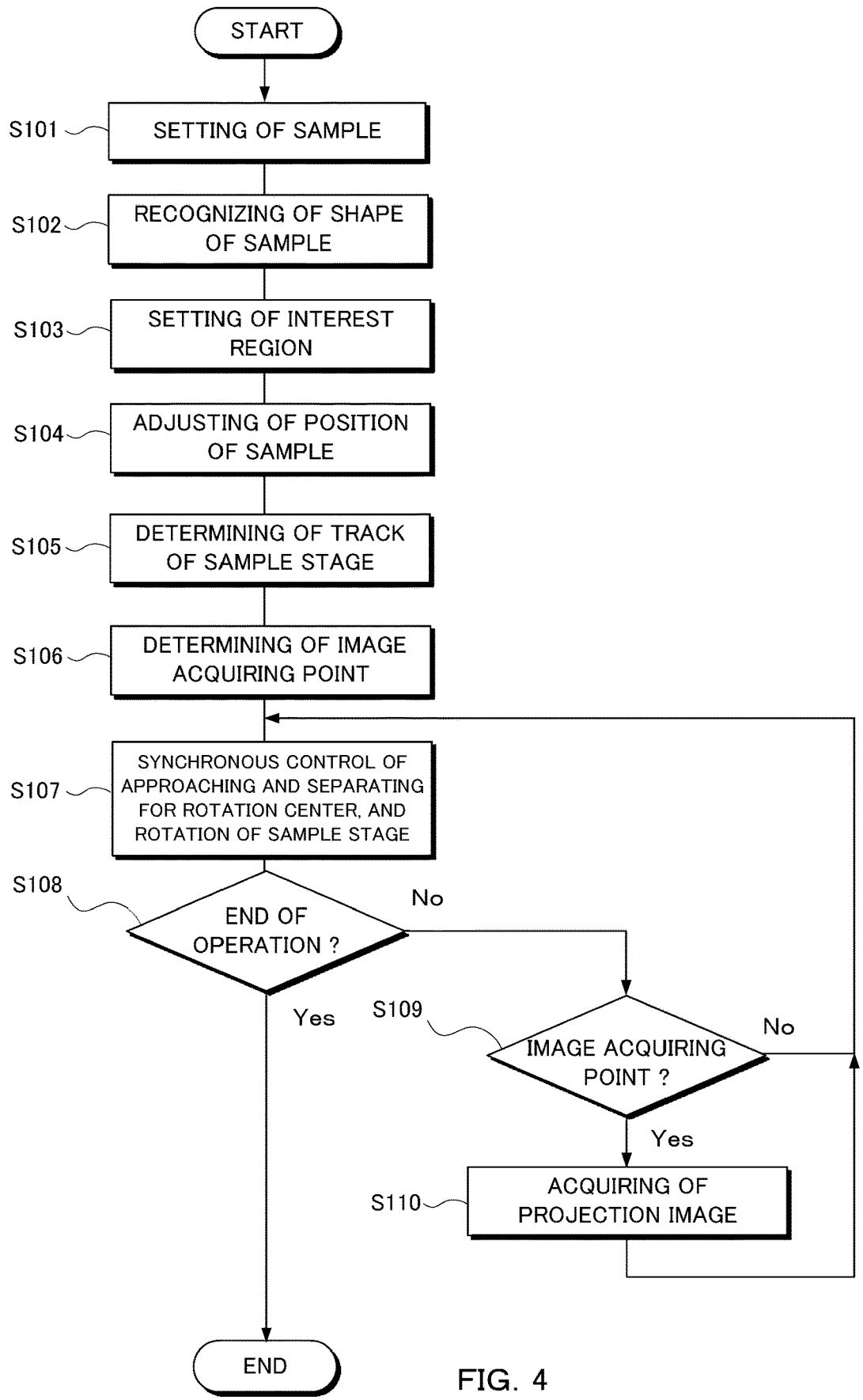
FIG. 4 is a flowchart showing an imaging method according to the first embodiment.

An imaging method of a sample using the X-ray CT measurement system 100 configured as described above is described. FIG. 4 is a flowchart showing the imaging method.

First, a user sets a sample at a position of a rotation center that is provided between the X-ray source 116a and the detector 117 (step S101). The sample is preferably set so as to include the rotation center, but does not necessarily includes it. Next, the shape of the sample is recognized (step S102). For example, in order to confirm the shape of the sample, a three-dimensional CT image may be acquired at low resolution; may be measured by a 3D scanner; and may be confirmed by a corresponding CAD drawing. The shape of the confirmed sample is preferably displayed by the output section 220.

A user sets an interest region of the sample based on the shape of the displayed sample (step S103). The position of the sample is adjusted based on the provided interest region (step S104). At the time, the sample is preferably set to make the interest region of the sample close to the rotation center. For example, when the X-ray source most approaches the rotation center, the interest region is preferably present between the X-ray source and the rotation center. Consequently, a desired place of a user can be observed at high spatial resolution.

Next, a track of the sample stage 114 with respect to the X-ray source 116a and the detector 117 is determined (step S105). Specifically, operations of approaching or separating of the rotation center to/from the X-ray generation section 116 or the detector 117, and rotation of the sample stage 114 are determined. The determination method is after-mentioned in detail. When the rotation center and the X-ray source 116a are most approached to each other, the X-ray source 116a preferably crosses a track of the shape of the sample when the sample makes one rotation around the rotation center. Consequently, the projection image can be acquired by approaching to a position colliding with the sample when one rotation is originally made, and thus the projection image at high spatial resolution can be obtained.

Then, a rotation angle at which the projection image is acquired as an image acquiring point is determined (step S106). The sample is rotated around the rotation center and the rotation center is approached or separated to/from the X-ray source according to the shape of the sample and the rotation angle of the sample, and thus the magnification ratio is basically different therefrom at each rotation angle. With respect to each of an interest region and other than the interest region, a rotation angle at which an image is acquired according to a desired pixel size is preferably determined. Consequently, determined is the resolution according to an angle of a structure to be viewed by a user.

When imaging is started, the computer 120 transmits control information to the imaging apparatus 110 with information input from a user as a trigger. At this time, first, operations of approaching or separating of the rotation center to/from the X-ray generation section 116 as well as the detector 117, and rotation of the sample stage 114 are synchronously performed with each other, based on the track of the sample stage 114 and the image acquiring point that have been determined (step S107).

Then, whether or not a series of operations are ended is determined (step S108). When it is determined that the operations are not ended, whether or not to be an image acquiring point is determined (step S109). The case where it is determined to be no image acquiring point results in returning to step S107. The case where it is determined to be an image acquiring point results in acquiring a projection image (step S110) followed by returning to step S107. On the other hand, when it is determined that the series of operations are ended in step S108, the operations are ended.

(Determination of Track of X-Ray Source with Respect to Rotation Center)

Figure 5A:
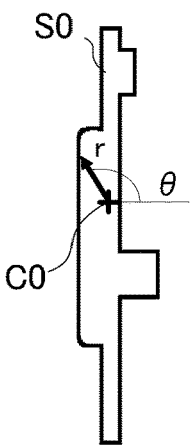
FIGS. 5A to 5C are a sectional side view showing a shape of a sample, and graphs showing the shape and the outermost shape of a sample cross-section on circular polar coordinates, respectively.
Figure 5B:
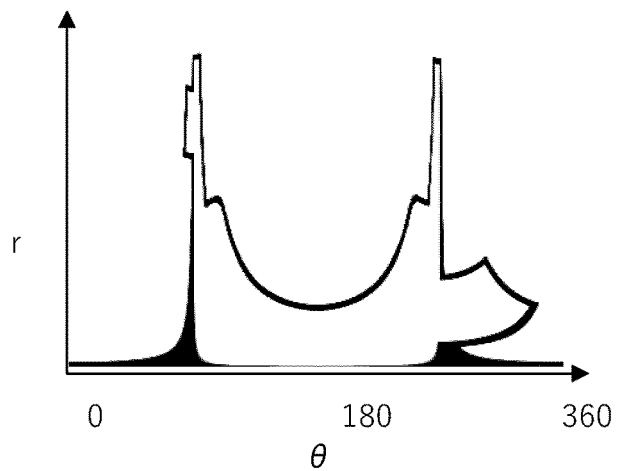
Figure 5C:
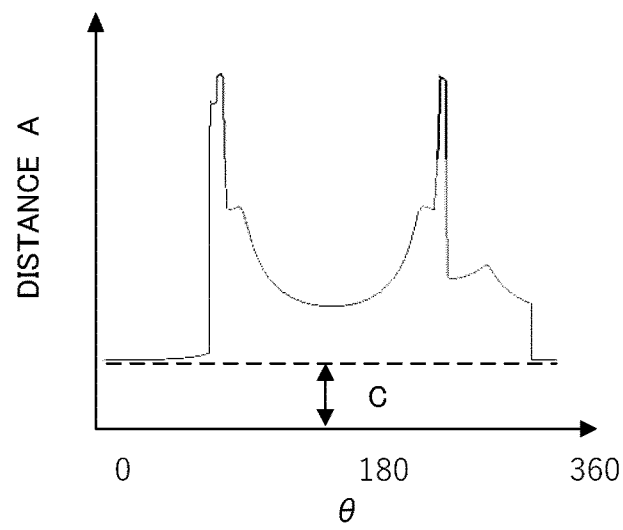

In order to efficiently acquire a projection image at high spatial resolution with no collision of the X-ray generation section 116 with the sample S0, a method of determining a track of the X-ray source 116a with respect to the rotation center C0 is described. FIGS. 5A to 5C are a sectional side view showing a shape of a sample, and graphs showing the shape and the outermost shape of a sample cross-section on circular polar coordinates, respectively. The shape of the sample is recognized in advance by a wide visual field, low resolution CT, a CAD drawing, a three-dimensional measurement apparatus and so forth. The position of the sample with respect to the rotation center is determined, when a user specifies the interest region ROI. The shape image of the sample is subjected to polar coordinate conversion to be displayed by a θ-r coordinate system with the rotation center of the sample stage as coordinates (0, 0) of an orthogonal coordinate system.

As shown in FIG. 5A, the shape of the sample S0 can be represented on a sectional side view of the sample S0 by an angle θ around the rotation center C0 and a distance r from the rotation center C0. AS shown in FIG. 5B, the shape of the sample S0 can be represented by a graph of a distance r with respect to an angle θ.

According to a certain angle θ, when r that represents the shape of the sample has multiple values, attention should be paid to the larger r in order to avoid collision of the sample S0 with the X-ray generation section 116. Actually, there is a distance C from the X-ray source 116a to the housing of the X-ray generation section 116, and thus one given by adding a distance C to an X-ray generation source in the θ-r correlation diagram can be treated as a distance A. The projection image can be efficiently and nondestructively acquired at high spatial resolution with no collision of the X-ray generation section 116 with the sample S0 by moving the sample stage with the track shown in FIG. 5C.

Figure 6:
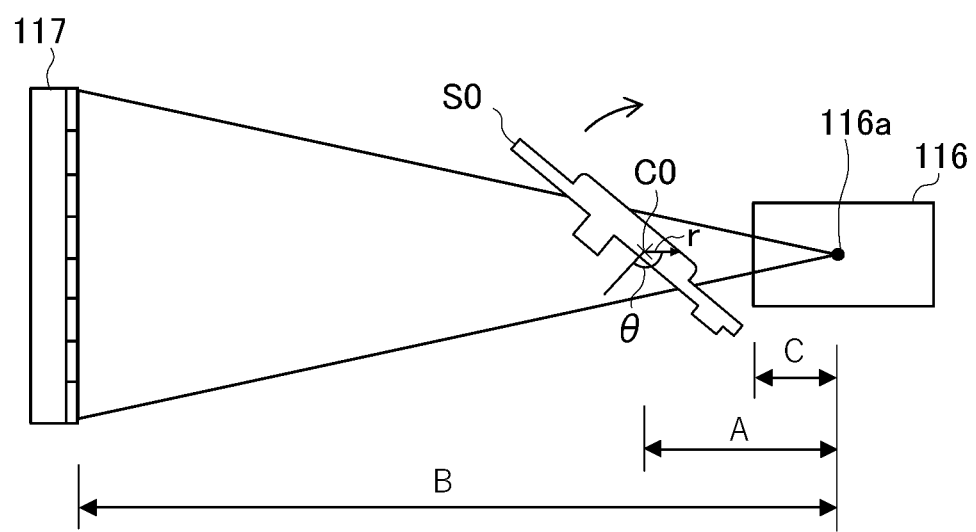
FIG. 6 is a sectional side view showing an shape position r in an irradiation direction of X-rays with respect to a rotation angle θ of a plate-shaped sample.

FIG. 6 is a sectional side view showing an shape position r in an irradiation direction of X-rays with respect to a rotation angle θ of a plate-shaped sample. The collision of the X-ray generation section 116 with the sample S0 can be avoided by controlling movement of the sample stage to maintain the distance A with respect to θ shown in FIG. 5C.

(Processing Method)

Figure 7:
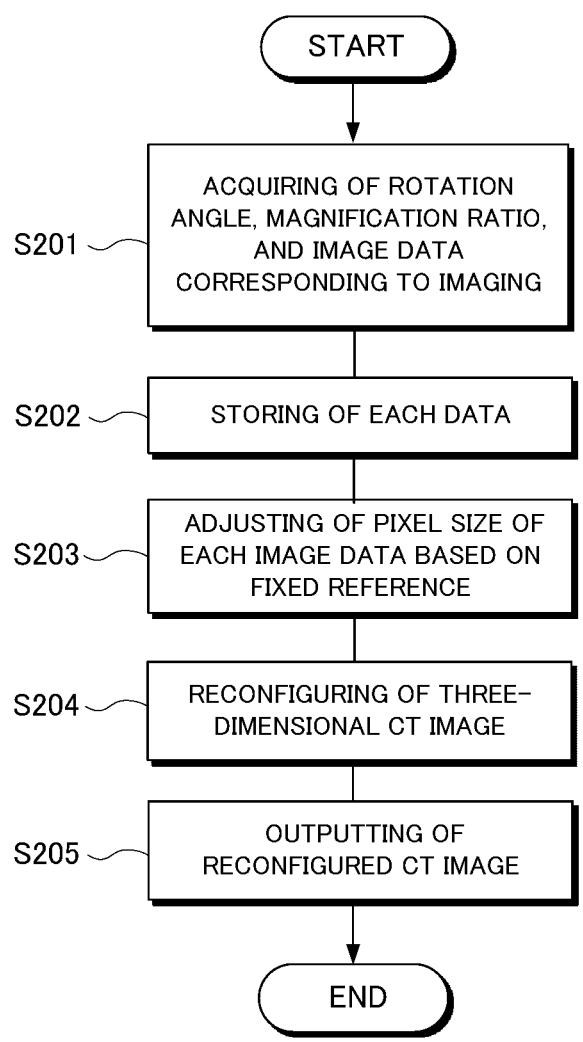
FIG. 7 is a flowchart showing a processing method according to the first embodiment.

The processing of projection image data obtained as described above is described. FIG. 7 is a flowchart showing a processing method. First, the processing apparatus acquires a rotation angle, a magnification ratio, and projection image data that correspond to imaging thereof, from the imaging apparatus 110 (step S201). The magnification ratio may be of a distance A between the X-ray source and the rotation center, or an effective pixel size. Each resulting data is made to correspond thereto, and is stored (step S202).

Next, the pixel size of each projection image data is adjusted based on a fixed reference (step S203). The adjustment is basically made by being matched with a smallest pixel size out of projection image data. Then, the three-dimensional CT image data is reconfigured using the projection image data whose pixel size is adjusted (step S204). As a result, the reconfigured three-dimensional CT image data is output (step S205), and the processing is ended.

Second Embodiment

According to the above-described embodiment, the operation of the sample stage is determined based on the shape of the sample S0 itself, but movement of the sample stage may be determined using a surrounding virtual shape including the shape of the sample. In addition, the first embodiment can also be considered as a case where the surrounding virtual shape is the shape itself of the sample.

Figure 8A:
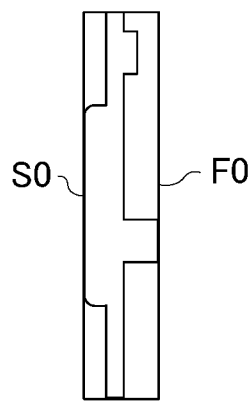
FIGS. 8A to 8C are a sectional side view of a surrounding virtual shape, a graph shown by using circular polar coordinates, and a sectional side view showing a position r in an irradiation direction of X-rays with respect to a rotation angle θ, respectively.
Figure 8B:
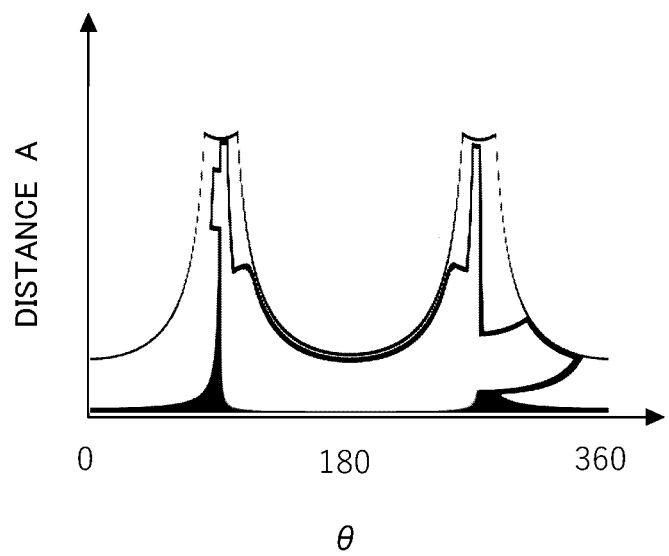
Figure 8C:
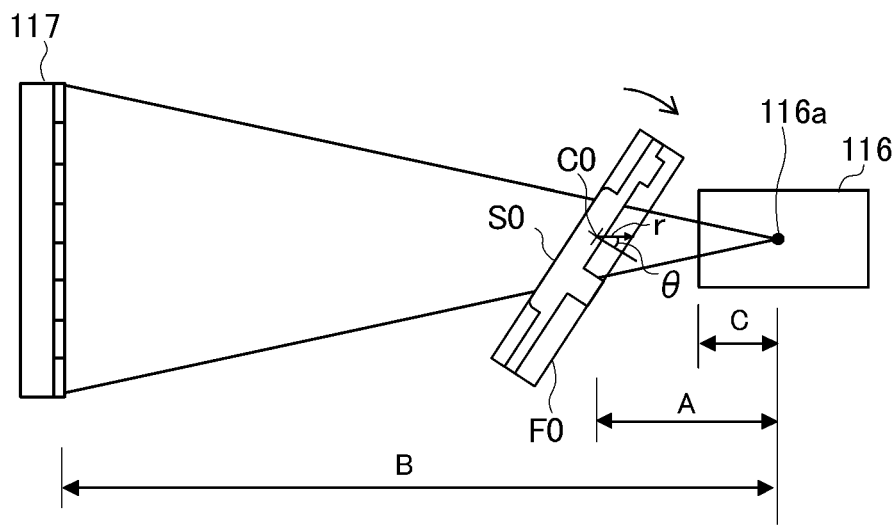

FIGS. 8A to 8C are a sectional side view of a surrounding virtual shape F0, a graph shown by using circular polar coordinates, and a sectional side view showing a position r in an irradiation direction of X-rays with respect to a rotation angle θ, respectively. For example, in examples shown in FIGS. 8A to 8C, the smallest rectangular shape including a whole shape of the sample S0 becomes the surrounding virtual shape F0.

As shown in FIG. 8B, a distance A between the X-ray source 116a and the rotation center C0 can be determined by converting the surrounding virtual shape F0 into a θ-r coordinate system, based on a graph that is determined from a rectangle. In this manner, it is preferable that the surrounding virtual shape F0 including the shape of the sample is recognized in a correspondence relation with an angle having the rotation center C0 as a central axis, and the X-ray source 116a is controlled not to collide with the sample S0 using the surrounding virtual shape. Consequently, the collision of the X-ray source 116a with the sample S0 can be avoided.

The surrounding virtual shape F0 is preferably in a simple shape having a margin. For example, the surrounding virtual shape F0 is provided as a columnar body (whose cross-section being in a simple shape such as a rectangle or the like) in a simple shape, and can be controlled the X-ray source 116a not to enter an inside of the surrounding virtual shape F0. Consequently, simplified is calculation for avoiding collision of the X-ray source 116a with the sample S0.

Third Embodiment

Figure 9:
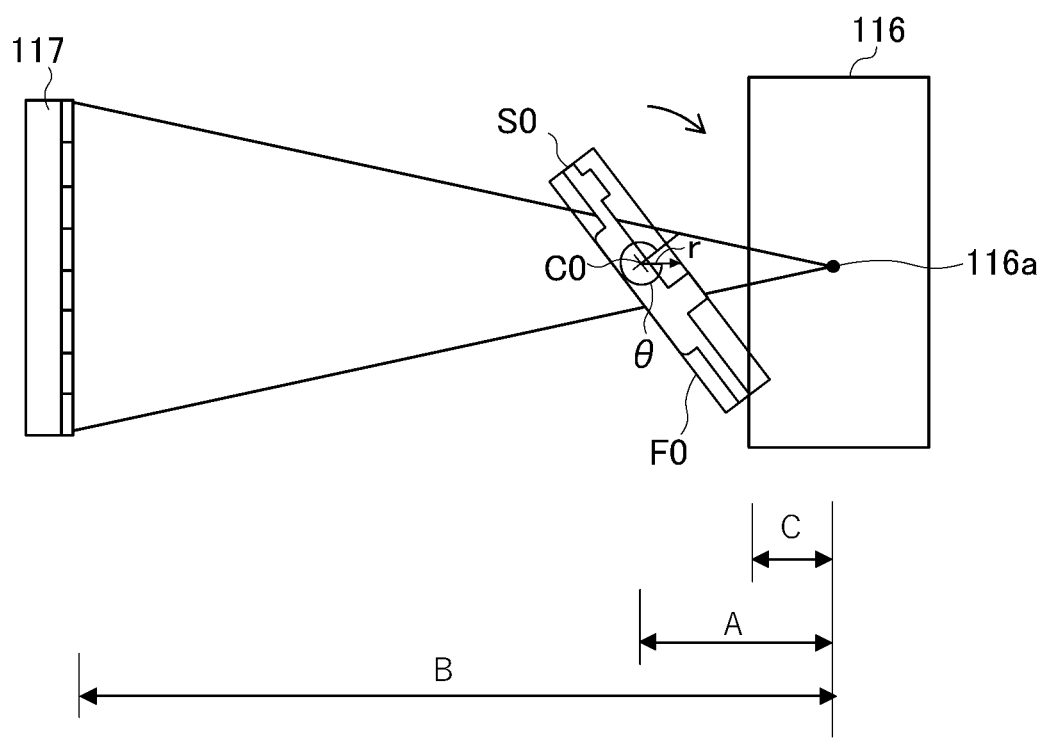
FIG. 9 is a sectional side view showing a position r in an irradiation direction of X-rays with respect to a rotation angle θ of a surrounding virtual shape, for an Xray generation section having a wide width.

According to the above-described embodiment, when determining a track of the sample stage 114, the housing dimension (length) in the optical axis direction of the X-ray generation section 116 is taken into account, but no width thereof is taken into consideration. FIG. 9 is a sectional side view showing a position r in an irradiation direction of X-rays with respect to a rotation angle θ of a surrounding virtual shape, for an Xray generation section 116 having a wide width. The X-ray generation section 116 used for Micro CT is large in size (width) in the direction perpendicular to the optical axis in many cases. As shown in FIG. 9, the X-ray generation section 116 having a wide width easily causes collision with respect to rotation of the sample S0.

In such a case, a track of a surrounding virtual shape F0 is preferably subjected to fitting with a curve to determine the track. For example, the minimum values $r_{min1}$, $r_{min2}$ and the maximum values $r_{max1}$, $r_{max2}$ are recognized from the track of the surrounding virtual shape F0, and a distance A can be controlled with the curve subjected to fitting based on these values.

Figure 10A:
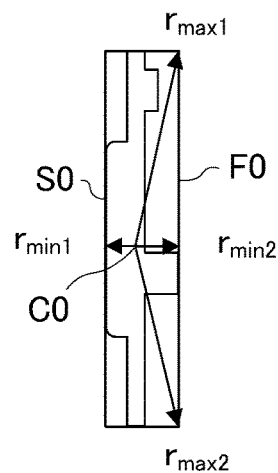
FIGS. 10A to 10C are a sectional side view of a surrounding virtual shape, a graph showing an shape by circular polar coordinates, and a graph showing fitting by a trigonometric function, respectively.
Figure 10B:
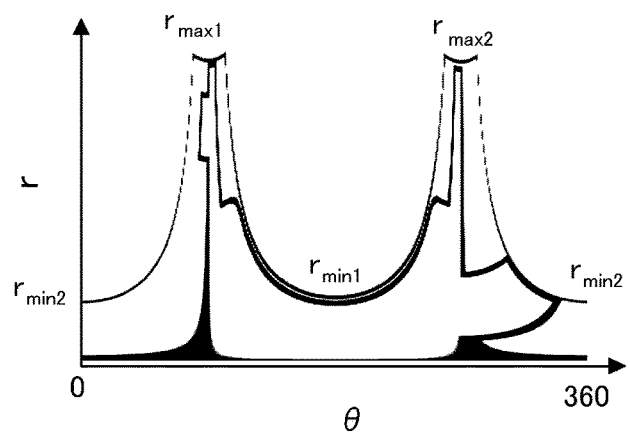
Figure 10C:
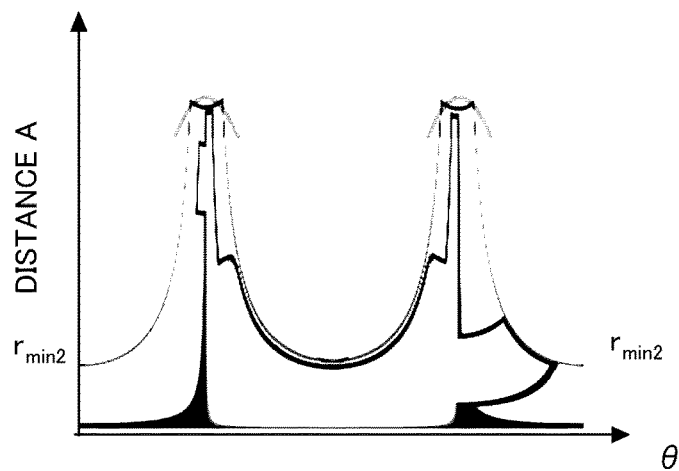

FIGS. 10A to 10C are a sectional side view of a surrounding virtual shape F0, a graph showing a shape by circular polar coordinates, and a graph showing fitting by a trigonometric function, respectively. First, as shown in FIG. 10A, the nearest distance $r_{min}$ and the farthest distance $r_{max}$ are examined in each range of 90° or 180° from the rotation center C0. In addition, when taking time, a distance to an angle of the surrounding virtual shape F0 may be examined.

Next, positions $r_{max}$, $r_{min}$ are checked by a θ-r coordinate system. Both of them become poles in the graph of θ-r. Then, each pole is subjected to fitting by a trigonometric function. At this time, the amplitude is $(r_{max}-r_{min})/2$. According to a plate-shaped sample, the cycle generally becomes twice the angular difference between the maximum point and the minimum point. In this way, the distance A can be controlled with the curve shown in FIG. 10C. In addition, a spline function is also usable in place of a trigonometric function.

For example, the distance A can be determined from the following formula by using $(\theta_{min1}, r_{min1})$ coordinates and $(\theta_{max2}, r_{max2})$ coordinates found from data of the shape of the sample S0 and the surrounding virtual shape F0.

$$A = C + (r_{max} - r_{min})/2 \times \sin\{2(\theta - \theta_0) \div (\theta_{max} - \theta_{min}) + \Delta\theta\}$$

Figure 11:
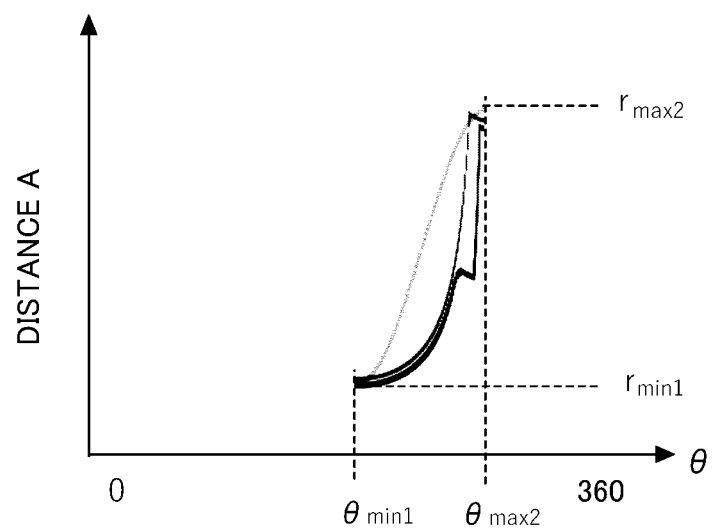
FIG. 11 is a graph showing a fitting result.

$\theta_0$: Angle at a pole for starting fitting
$\Delta\theta$: Initial phase for determining a phase of a trigonometric function FIG. 11 is a graph showing a fitting result. In this case, $\theta_0 = \theta_{min1}$, and $\Delta\theta = -90°$ since A is desired to be minimized at $\theta_{min1}$. The minimum point and the maximum point of a sine curve obtained by fitting correspond to $\theta_{min1}, r_{min1}$, and $\theta_{max2}, r_{max2}$; respectively.

In this manner, a track of the X-ray source 116a with respect to a proper rotation center can be also determined for the X-ray generation section 116 having a wide width by performing fitting with a curve function representing a waveform based on a pole of the surrounding virtual shape F0. In addition, a position of the surrounding virtual shape F0, that becomes closest to the X-ray source 116a within the range of the width of the X-ray generation section 116 is found, and the track of the rotation center C0 may be determined based on this.

Fourth Embodiment

When the cross-section of the sample S0 is constantly equal thereto, the surrounding virtual shape F0 can be defined as a columnar body in a simple shape, but when the frame of the cross-section is different therefrom, simple definition thereof is difficult. That is, when a shape of the cross-section having different height according to the sample S0 is different therefrom, increased is a burden caused by calculating the θ-r relation with respect to the whole cross-section. Then, it is preferable that the surrounding virtual shape F0 is defined as a columnar body in a shape obtained by integration of the projection of the cross-section. FIGS. 12A to 12D are a perspective view showing a sample S0, sectional views each showing a surrounding virtual shape F0 of each cross-section, and a figure showing an image obtained by integrating each cross-section, respectively.

Figure 12A:
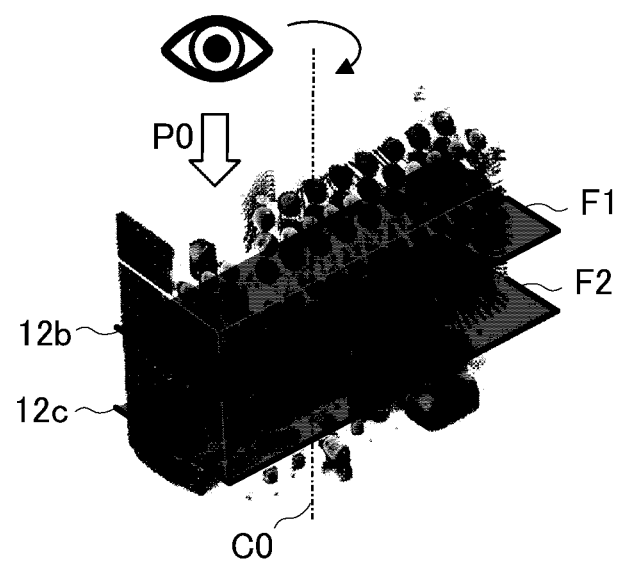
FIGS. 12A to 12D are a perspective view showing a sample, sectional views each showing a surrounding virtual shape of each cross-section, and a figure showing an image obtained by integrating each cross-section, respectively.
Figure 12B:
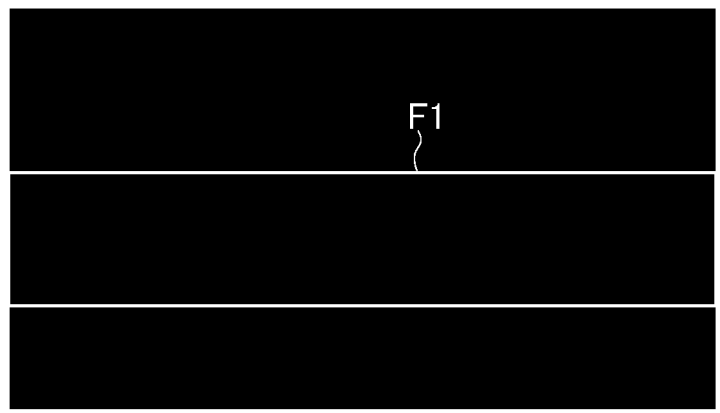
Figure 12C:
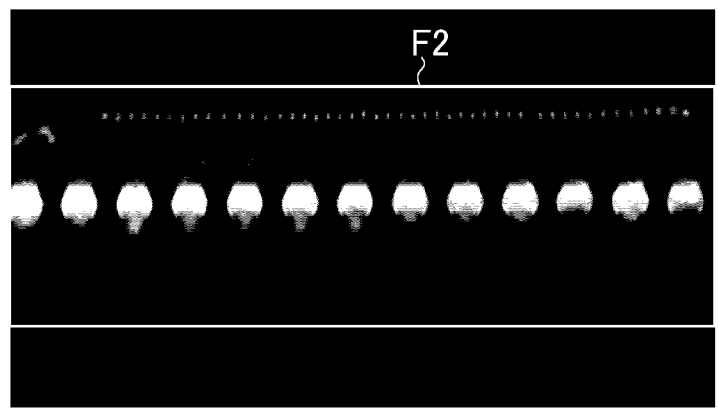
Figure 12D:
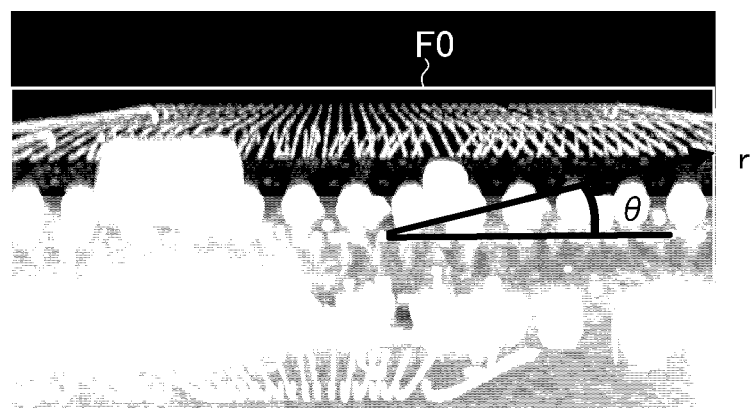

In an example shown in FIG. 12A, the cross-sections 12b, 12c are projected in the direction P0 parallel to the rotation center C0. According to the cross-section 12b shown in FIG. 12B, the local surrounding virtual shape F1 is represented by a thin rectangle. According to the cross-section 12c shown in FIG. 12C, the local surrounding virtual shape F2 is represented by a thick rectangle. As shown in FIG. 12D, a shape obtained by integrating these is represented as a whole surrounding virtual shape F0.

In this manner, it is preferable to recognize the surrounding virtual shape F0 by integrating the cross-section perpendicular to the rotation center C0 of the sample S0. This leads to speeding-up and high accuracy when calculating the θ-r relation from the shape of the sample, and thus the calculation for avoiding collision of the X-ray source 116a with the sample S0 is facilitated.

Fifth Embodiment

Figure 13A:
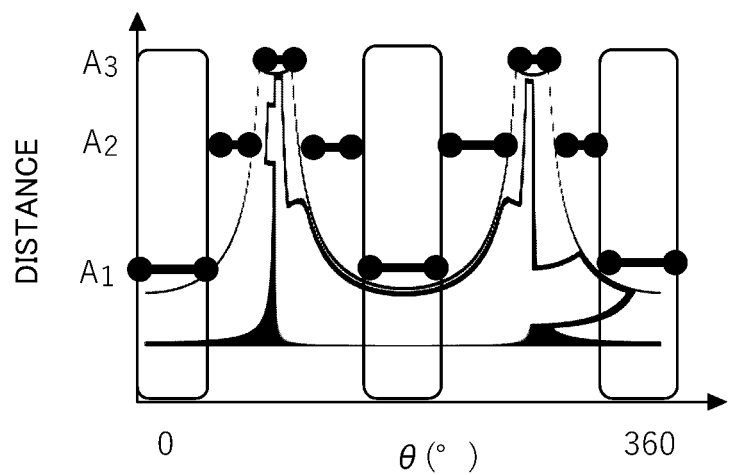
FIGS. 13A to 13C are graphs showing acquiring points on circular polar coordinates by distances, magnification ratios and F, respectively.
Figure 13B:
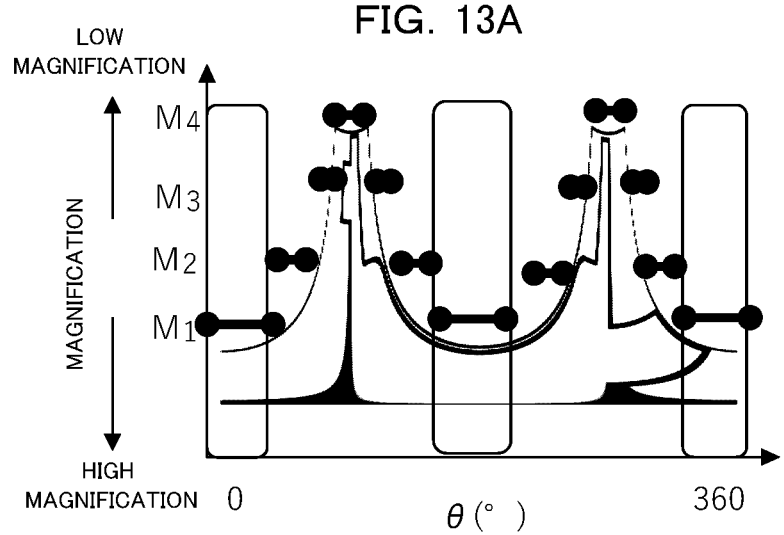
Figure 13C:
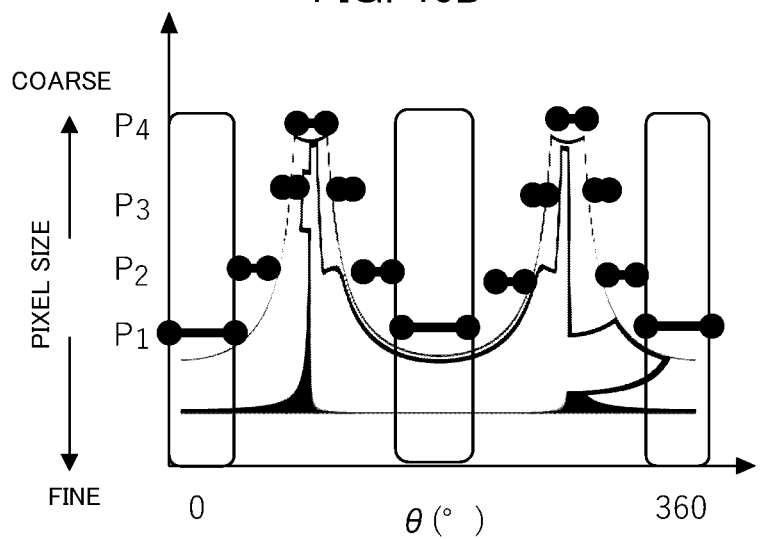

According to the above-described embodiment, it is optional to determine an image acquiring point, but when efficiency is taken into consideration, it is preferable that several kinds of magnification ratios are discretely provided to determine the image acquiring point. FIGS. 13A to 13C are graphs showing image acquiring points on circular polar coordinates by distances A1-A3, magnification ratios M1-M4 and pixel sizes P1-P4, respectively.

In an example of FIG. 13A, the projection image of the sample S0 is acquired while changing several distances A each between the X-ray-source 116a and the rotation center C0, according to the rotation angle θ of the sample S0, without being continuous. The image acquiring points are on the line connecting black circles in the figure. How to change the distance A may be determined by movement accuracy of the sample stage 114, or the like.

Further, as shown in FIG. 13B, the number of points at which the distance A is changed may be determined by representing a vertical axis by a geometrical magnification ratio M=B/A in place of the distance A, and matching it with a desired magnification ratio. Further, as shown in FIG. 13C, the number of points at which the distance A is changed may be determined by representing the vertical axis by an effective pixel size in place of the distance A, and matching it with a desired pixel (resolution). This case is specifically preferable because how a structure in size to be viewed by a user is changed by a rotation angle is found.

Sixth Embodiment

According to the above-described embodiment, the track of the sample stage 114 is determined based on the shape of the sample S0, that is recognized in advance, but the track is determined by each control at that place, and the X-ray source 116a can be approached to the sample S0 while preventing collision thereof with the sample.

Figure 14:
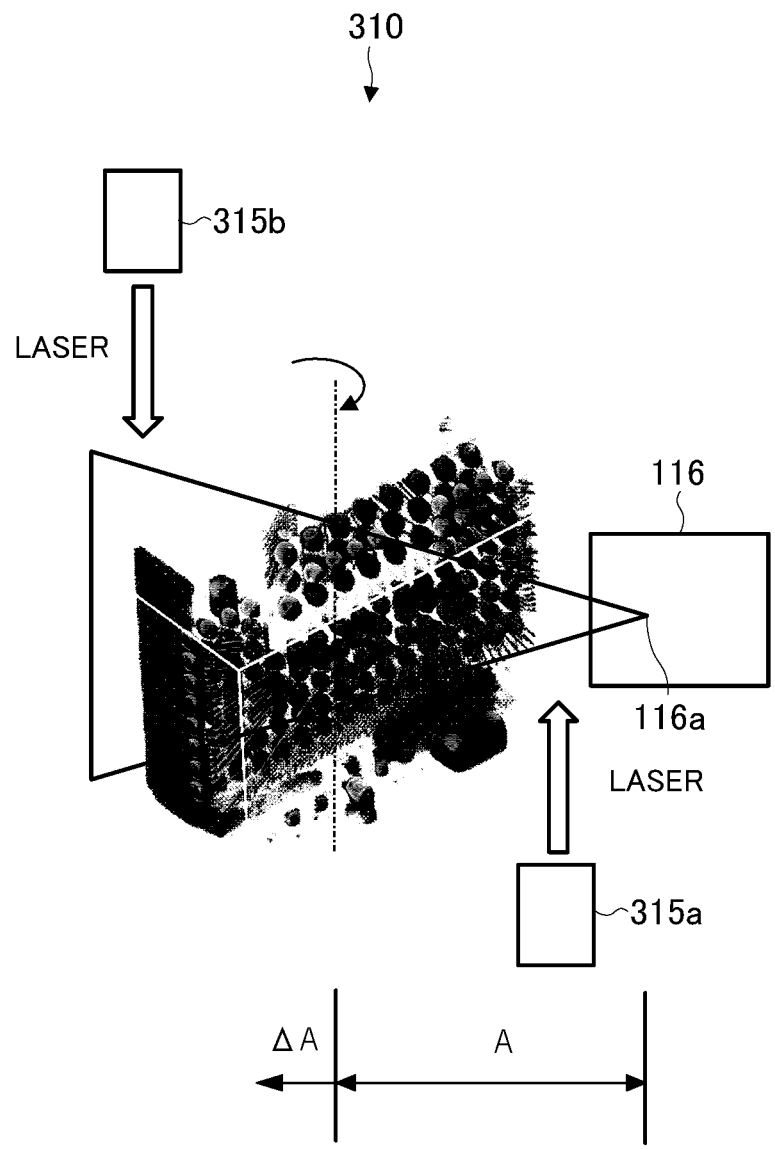
FIG. 14 is a schematic diagram showing a configuration of an imaging apparatus according to the sixth embodiment.

FIG. 14 is a schematic diagram showing a configuration of an imaging apparatus 310. The imaging apparatus 310 comprises sensors 315a, 315b. The sensors 315a, 315b can detect a position at an end portion on the X-ray source side in the optical direction of the sample by laser. An optical camera may be used in place of a sensor using laser. Two sensors 315a, 315b are provided as a front/rear pair for the X-ray source 116a, and when a signal indicating that the sample S0 is approached to the X-ray source 116a from the sensor 315a on the X-ray source 116a side comes, A is made larger by each fixed distance of ΔA. On the other hand, when a signal comes from the sensor 315b on the side away from the X-ray source 116a, approaching is made by each ΔA.

Positional information at the end portion of the resulting sample S0 is transmitted to the computer 120 (control apparatus). The computer 120 determines whether or not a distance between an end portion of the sample S0 and the X-ray source becomes a threshold value or less. When it is determined if the distance between the end portion of the sample and the X-ray source becomes a threshold value or less, the sample S0 is controlled to be separated from the X-ray source 116a with a fixed distance via the control unit 111. Consequently, the distance between the X-ray source 116a and the rotation center C0 can be taken via control during imaging without recognizing the shape of the sample S0 in advance.

Seventh Embodiment

According to the above-described embodiment, an example of an imaging apparatus for X-ray CT is described, but may be applied to an X-ray microscope. The imaging apparatus for X-ray CT approaches or separates a rotation center at which a sample is set to/from a fixed X-ray source, and a magnification ratio can be changed via approaching or separation thereof. On the other hand, the X-ray microscope is one that approaches or separates a detector to/from a fixed sample and a distance between an X-ray source and a sample set at a rotation center is constant, and thus no magnification ratio is changed.

Figure 15A:
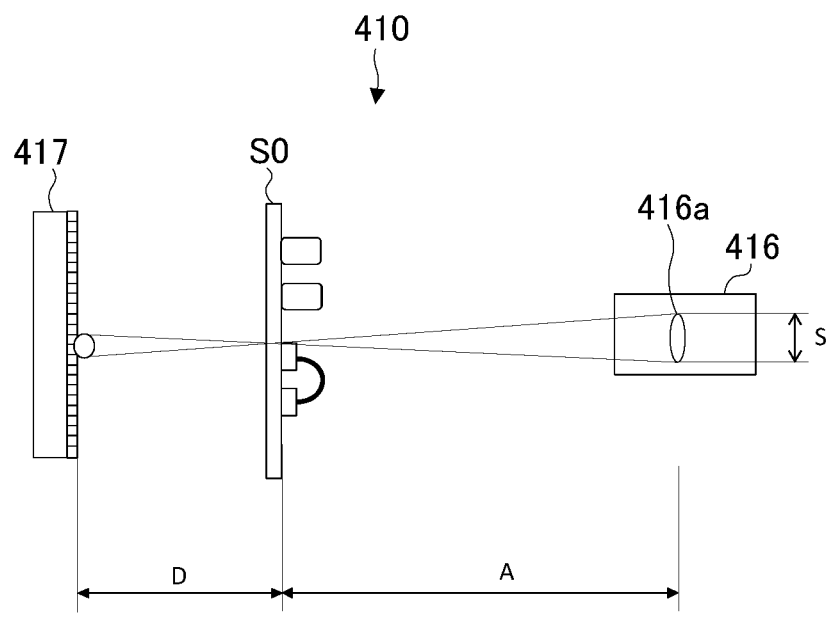
FIGS. 15A and 15B are schematic diagrams showing mechanisms in which half shadow, and blurring caused by Fresnel diffraction of an X-ray microscope are generated, respectively, according to the seventh embodiment.
Figure 15B:
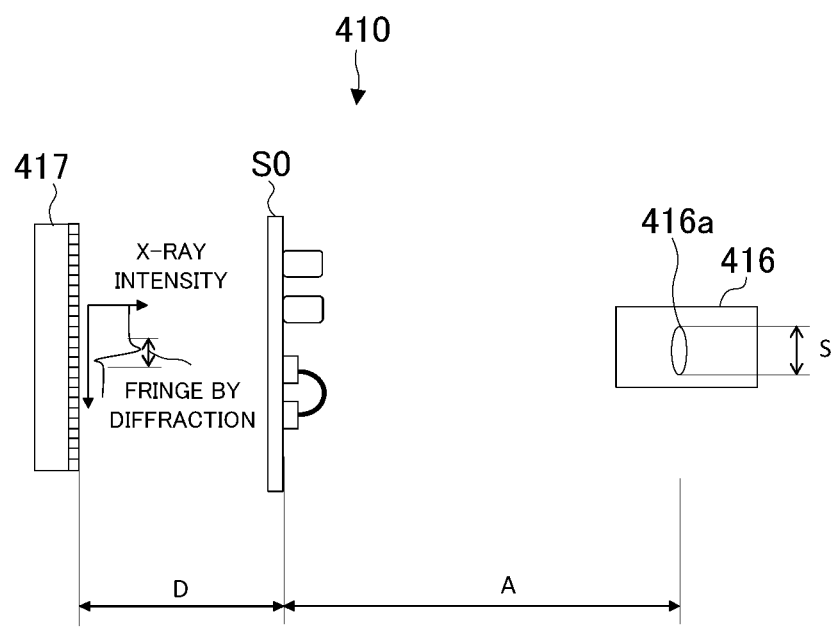
Figure 17A:
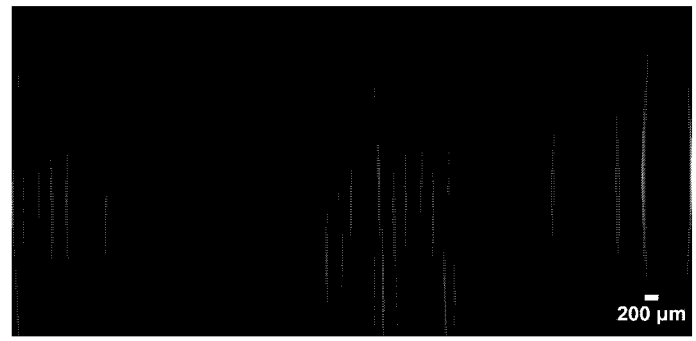
FIGS. 17A to 17E are figures showing CT tomographic images at respective image-acquiring points according to Example.
Figure 17B:
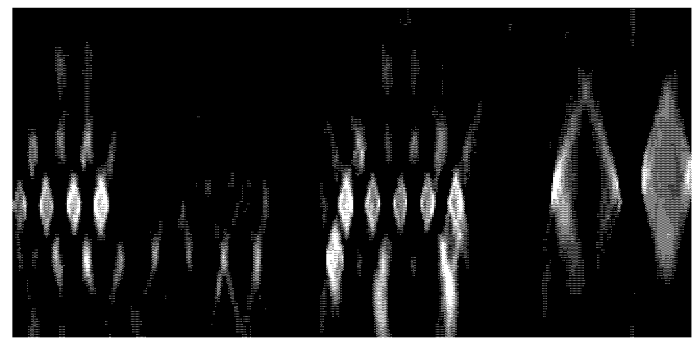
Figure 17C:
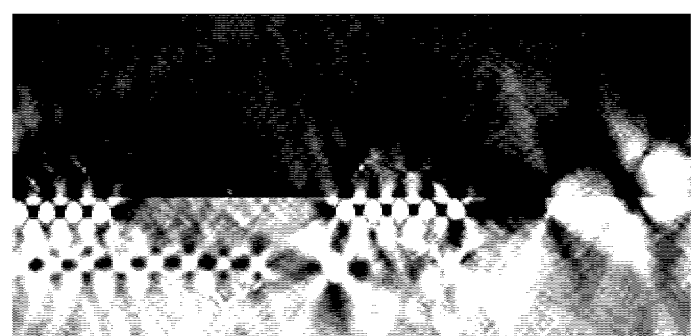
Figure 17D:
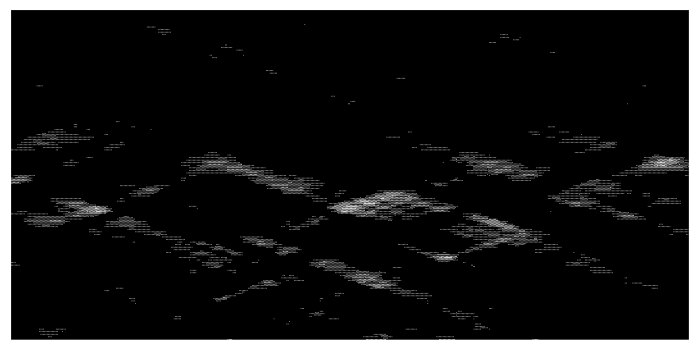
Figure 17E:
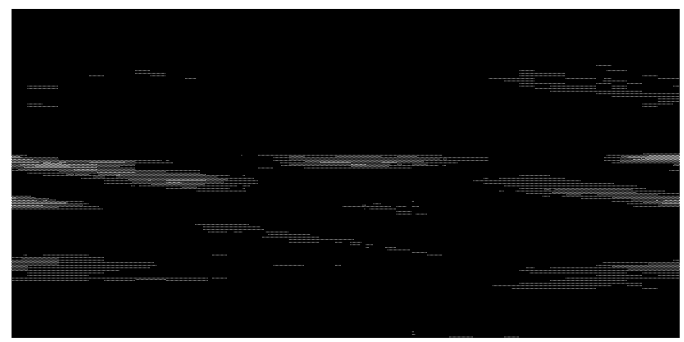

Even when using an X-ray microscope, in the case of a large sample, a sample cannot be approached to a detector, and thus the resolution is lowered. FIGS. 15A and 15B are schematic diagrams showing mechanisms in which half shadow, and blurring caused by Fresnel diffraction of an X-ray microscope 410 are generated, respectively. As shown in FIG. 15A, influence of half shadow blurring by finiteness of size S of the X-ray source 416a inside the X-ray generation section 416 is represented by half shadow blurring=(D/A)S. Further, as shown in FIG. 15B, blurring caused by Fresnel diffraction in correspondence to the distance between the sample S0 and the detector 417 is represented by a fringe width by diffraction=$\sqrt{\phantom{Dxwavelength}}$ (D×wavelength). In this manner, any blurring depends on a distance D between the sample S0 and the detector 417, and when separating the detector 417 from the sample S0, the resolution is lowered by influence of blurring caused by the half shadow as well as Fresnel diffraction.

Then, the projection image is acquired while simultaneously and continuously performing movement of approaching or separating the detector 417 to/from the fixed sample S0, and rotation of the detector 417 with respect to the sample S0. Consequently, can be obtained is the projection image at high resolution, whose blurring caused by the half shadow as well as Fresnel diffraction is reduced.

EXAMPLE

Images of a substrate sample provided with electronic components, bonding, and wires were practically acquired by the above-described imaging method. The sample in a plate shape having a width of 150 millimeters and a thickness of several millimeters is used. One for X-ray Micro CT is used as an X-ray source.

Images were acquired with keeping a distance A between an X-ray source and a rotation center be constant, as Comparative example. Images were acquired at a distance A of 148 millimeters between the X-ray source and the rotation center and at a distance B of 224 millimeters between the X-ray source and the detector. The magnification ratio was 1.5 times, and the effective pixel size at the sample position was 38 μm. The sample was left at a long distance to avoid colliding with the X-ray source or a cover of the X-ray detector and rotate the sample 360°.

Next, images of Example were acquired. The projection image data was acquired while varying a distance A between an X-ray source and a rotational axis, when the sample was rotated.

Five kinds of CT tomographic images each having a difference distance A between an X-ray source and a rotation center were obtained by acquiring Example. FIG. 16 is a table showing an image acquiring point and an effective pixel size for each projection image in Example. FIGS. 17A to 17E are figures showing projection images at respective image acquiring points according to Example. FIGS. 17A to 17E correspond to imaging numbers 1 to 5 in FIG. 16, respectively.

Figure 18A:
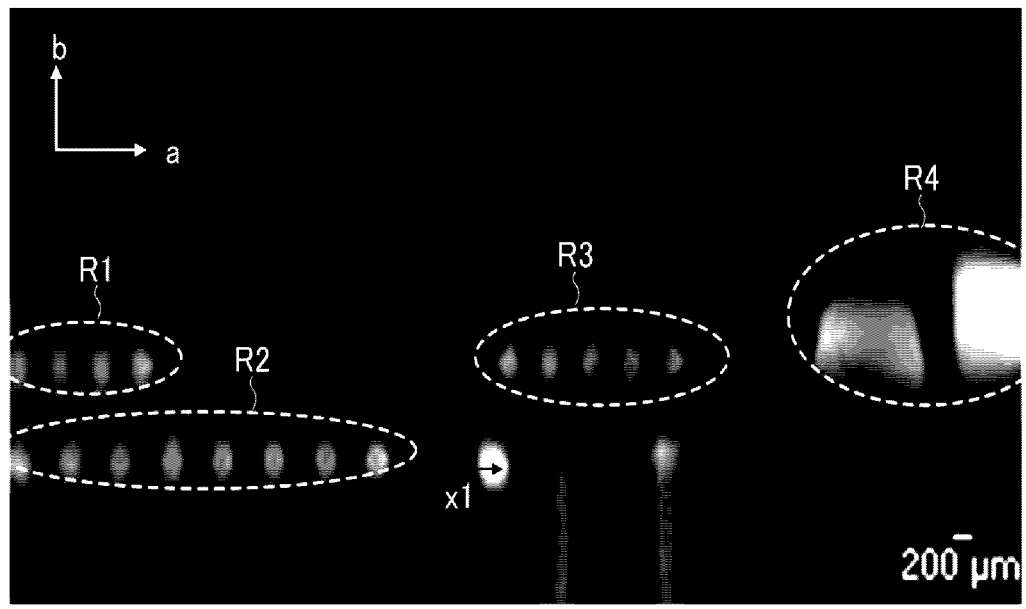
FIGS. 18A and 18B are figures showing CT tomographic images in Comparative example and Example, respectively.
Figure 18B:
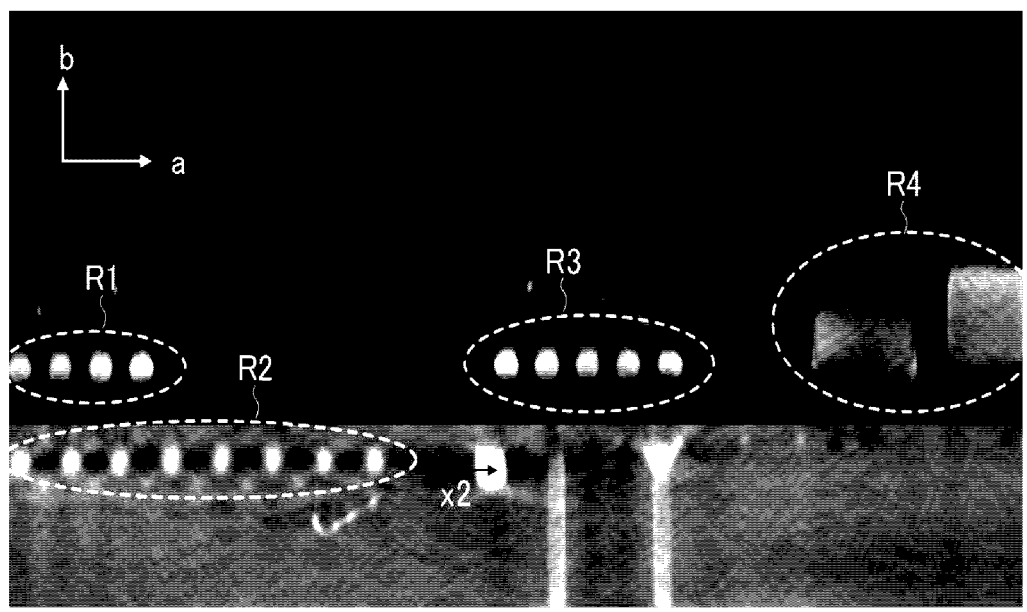

The projection image data obtained in Comparative example was reconfigured by a conventional method. Further, the projection image data obtained in Example was reconfigured by matching all the pixel sizes with 5 μm that is smallest in pixel size. FIGS. 18A and 18B are figures showing CT tomographic images in Comparative example and Example, respectively.

As shown in FIGS. 18A and 18B, as to regions R1 to R3 in a sample, it is understood that no image of boundary is acquired in Comparative example, but in contrast, images of boundaries are acquired in Example. Further, as to a region R4, shape of the electronic component is unclear in Comparative example, but in contrast, the shape is clearly shown in Example, and thus it is understood that resolution in the thickness direction of a plate-shaped sample is improved. Those at which an image is made clear by improvement of the resolution of Example in comparison with Comparative example are boundaries in the direction parallel to an arrow b in the figure. On the other hand, as to the direction parallel to an arrow a, clarity of the image between Comparative example and Example remains unchanged, and thus no resolution is varied either.

Figure 19:
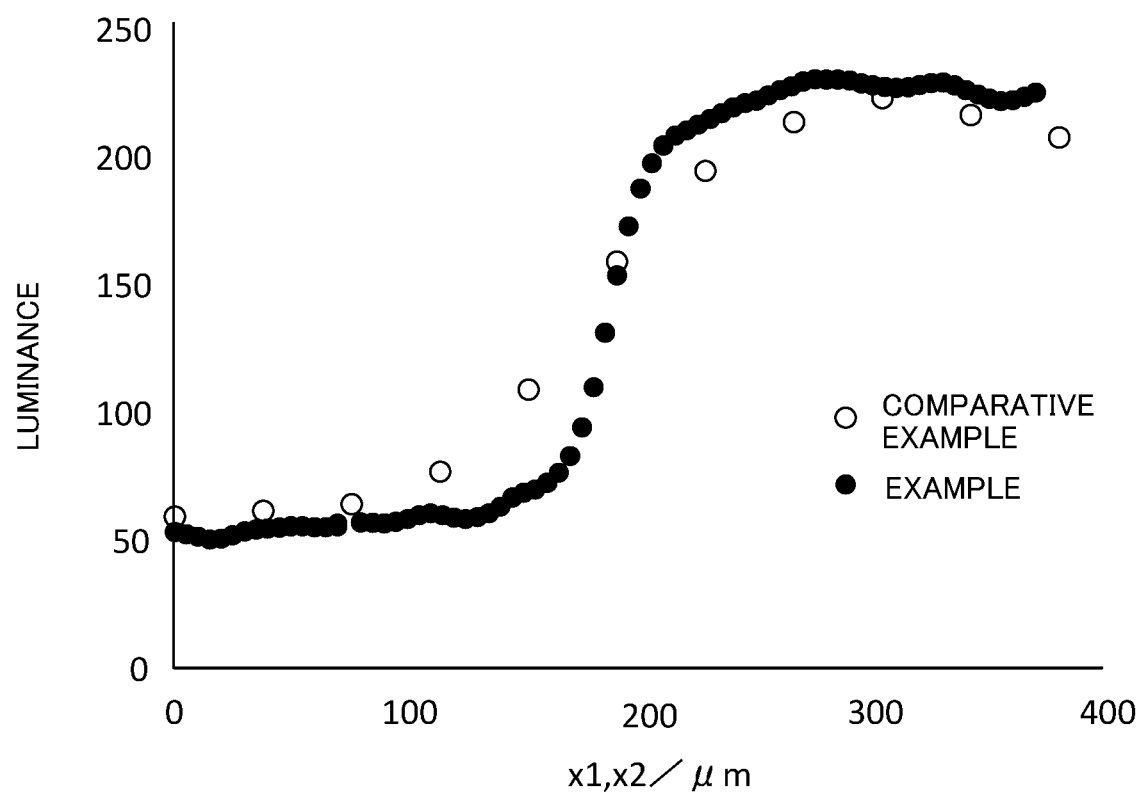
FIG. 19 is a graph showing CT values on straight lines x1 and x2 according to FIGS. 18A and 18B.

FIG. 19 is a graph showing CT values on straight lines x1 and x2 according to FIGS. 18A and 18B. As shown in FIG. 19, it is understood that change in CT value at the boundaries is clearly shown in the graph of Example. From those described above, it has been actually proven by the present invention that as to a sample having a fine structure of several ten μm, the structure can be observed at higher spatial resolution.

EXPLANATION OF THE SYMBOLS

100 X-ray CT measurement system
110 Imaging apparatus
111 Control unit
113 Stage drive mechanism
114 Sample stage
116 X-ray generation section
116a X-ray source
117 Detector
120 Computer
121 ROI providing section
122 Rotation control section
123 Advancing/retreating control section
124 Imaging control section
125 Data acquisition section
126 Storage section
127 Pixel adjustment section
128 Reconfiguration section
210 Input section
220 Output section
310 Imaging apparatus
315a, 315b Sensor
410 X-ray microscope
416 X-ray generation section
416a X-ray source
417 Detector
A Distance between X-ray source and rotation center
B Distance between X-ray source and detector
C Distance to housing of X-ray generation section
D Distance between sample and detector
C0 Rotation center
F0, F1, F2 Surrounding virtual shape
L Control bus
P0 Direction
P1-P4 Pixel size
R1-R4 Region
ROI Region of Interest
S0 Sample
S Size of X-ray source

The invention claimed is:

1. A method acquiring a projection image of a sample whose shape is uneven with respect to a rotation center, the method comprising the steps of:
    setting the sample at a position of the rotation center provided between an X-ray source and a detector, and
    acquiring the projection image of the sample at each different rotation angle for each different magnification ratio over a rotation angle of 180° or more by rotating the sample around the rotation center, and by relatively changing a separation distance between the X-ray source and the rotation center, or a separation distance between the rotation center and the detector in an optical axis direction according to the shape of the sample and the rotation angle of the sample,
    wherein rotation of the sample, and changing of the separation distance are simultaneously and continuously performed so that the X-ray source does not collide with the sample by recognizing a surrounding virtual shape including the shape of the sample with a set of positions for angles around the rotation center as a central axis and determining a track of the X-ray source with respect to the rotation center based on the pole of the surrounding virtual shape, prior to acquiring the projection image.

2. The method according to claim 1,
    wherein the X-ray source is approached or separated to/from the rotation center in order to acquire the projection image.

3. The method according to claim 1,
    wherein the detector is approached or separated to/from the rotation center in order to acquire the projection image.

4. The method according to claim 1,
    wherein the X-ray source when being most approached to the rotation center is in a region formed by a track of the shape of the sample when the sample makes one rotation around the rotation center.

5. The method according to claim 1,
    wherein the surrounding virtual shape is recognized by integrated cross-sections perpendicular to the rotation center of the sample.

6. The method according to claim 1,
    wherein the surrounding virtual shape is provided as a columnar body in a simple shape, and the X-ray source is controlled not to enter an inside of the surrounding virtual shape.

7. The method according to claim 1,
wherein a track of the X-ray source with respect to the rotation center is determined by fitting a curve function representing a waveform based on the pole of the surrounding virtual shape.

8. The method according to claim 1, further comprising the step of providing an interest region of the sample,
wherein the sample is set to make the interest region of the sample close to the rotation center.

9. The method according to claim 8,
wherein with respect to each of the interest region and other than the interest region, a rotation angle at which acquiring is performed according to a desired pixel size is determined.

10. The method according to claim 1,
wherein the sample is formed into a plate shape with a base material and a filler dispersed in the base material.

11. The method according to claim 1, wherein the acquiring step further includes,
storing the projection image data of the sample acquired at each different rotation angle for each different magnification ratio,
matching a pixel size of the stored projection image data of the sample to a fixed reference; and
reconfiguring a three-dimensional CT image using the projection image data obtained by adjusting the pixel size.

12. A control apparatus for acquiring a projection image of a sample whose shape is uneven with respect to a rotation center, the control apparatus comprising:
a rotation control section that rotates the sample set at a position of the rotation center provided between an X-ray source and a detector around the rotation center;
an advancing/retreating control section by which the X-ray source or the detector is approached or separated to/from the rotation center according to the shape of the sample and the rotation angle of the sample; and
an imaging control section that acquires the projection image of the sample at each different unduplicated magnification ratio for each different rotation angle over a rotation angle of 180° or more,
wherein rotation of the sample, and changing of the separation distance are simultaneously and continuously performed so that the X-ray source does not collide with the sample by recognizing a surrounding virtual shape including the shape of the sample with a set of positions for angles around the rotation center as a central axis and determining a track of the X-ray source with respect to the rotation center based on the pole of the surrounding virtual shape, prior to acquiring the projection image.

13. The control apparatus according to claim 12, wherein the imaging control section includes a processor and a memory storing a program that causes the processor to:
store the projection image data of the sample acquired at each different rotation angle for each different magnification ratio,
match a pixel size of the stored projection image data of the sample to a fixed reference; and
reconfigure a three-dimensional CT image using the projection image data obtained by adjusting the pixel size.

* * * * *